United States Patent
Knoll et al.

(10) Patent No.: US 6,593,430 B1
(45) Date of Patent: *Jul. 15, 2003

(54) TRANSPARENT, IMPACT-RESISTANT POLYSTYRENE ON A STYRENE-BUTADIENE BLOCK COPOLYMER BASIS

(75) Inventors: Konrad Knoll, Ludwigshafen (DE); Wolfgang Fischer, Walldorf (DE); Hermann Gausepohl, Mutterstadt (DE); Jürgen Koch, Neuhofen (DE); Josef Wünsch, Schifferstadt (DE); Paul Naegele, Otterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/936,784
(22) PCT Filed: Mar. 23, 2000
(86) PCT No.: PCT/EP00/02568
§ 371 (c)(1), (2), (4) Date: Sep. 18, 2001
(87) PCT Pub. No.: WO00/58380
PCT Pub. Date: Oct. 5, 2000

(30) Foreign Application Priority Data

Mar. 27, 1999 (DE) .......................... 199 14 075

(51) Int. Cl.[7] .................. C08F 297/04; C08F 293/00
(52) U.S. Cl. .................. 525/314; 525/271; 525/272; 526/79; 526/86; 526/174
(58) Field of Search .................. 525/271, 314, 525/272; 526/79, 86, 174

(56) References Cited

U.S. PATENT DOCUMENTS

| | | | | |
|---|---|---|---|---|
| 3,632,682 A | 1/1972 | Darcy | .......... | 260/879 |
| 3,767,632 A | 10/1973 | Halasa | .......... | 260/83 |
| 3,872,177 A | 3/1975 | Halasa | .......... | 260/665 |
| 3,944,528 A | 3/1976 | Loveless | .......... | 260/83 |
| 4,603,155 A | 7/1986 | Muramori et al. | .......... | 525/314 |
| 4,939,208 A | 7/1990 | Lanza et al. | .......... | 525/93 |
| 6,197,889 B1 * | 3/2001 | Knoll et al. | .......... | 525/314 |

FOREIGN PATENT DOCUMENTS

| | | |
|---|---|---|
| DE | 19615533 | 10/1997 |
| DE | 19715035 | 10/1998 |
| EP | 654488 | 5/1995 |
| EP | 842962 | 5/1998 |
| GB | 1556234 | 11/1979 |

OTHER PUBLICATIONS

Wofford et al, *J. Polymer Sci.*, Part A–1, vol. 7, 461–469, 1969.

Smith et al. *ACS Polymer Preprints*, 34(2), 672–673, 1993.

Smith et al., *ACS Polymer Preprints*, 35(2), 466–467, 1994.

* cited by examiner

*Primary Examiner*—Fred Teskin
(74) *Attorney, Agent, or Firm*—Keil & Weinkauf

(57) ABSTRACT

Block copolymers comprise at least two hard blocks $S_1$ and $S_2$ made from vinylaromatic monomers and, between these, at least one random soft block B/S made from vinylaromatic monomers and from dienes, where the proportion of the hard blocks is above 40% by weight, based on the total block copolymer.

13 Claims, No Drawings

TRANSPARENT, IMPACT-RESISTANT POLYSTYRENE ON A STYRENE-BUTADIENE BLOCK COPOLYMER BASIS

The invention relates to block copolymers comprising at least two hard blocks $S_1$ and $S_2$ made from vinylaromatic monomers and, between these, at least one random soft block B/S made from vinylaromatic monomers and from dienes, where the proportion of the hard blocks is above 40% by weight, based on the total block copolymer.

The invention further relates to a process for preparing the block copolymers, and also to their use.

U.S. Pat. No. 4,939,208 describes linear, transparent styrene-butadiene block copolymers of the structure $S_1$—$B_1$—B/S—$S_2$. The polymerisation of styrene and butadiene in the presence of a Lewis base, in particular tetrahydrofuran (randomizer), gives the random copolymer block B/S. The length of the B/S segment depends on the amount of Lewis base.

EP-A 0 654 488 describes polymodal coupled styrene-butadiene block copolymers. The blocks B/S contain a styrene gradient (tapered block). By adding polar compounds, such as tetrahydrofuran, as randomizers, the random proportion in the blocks can be increased.

Polymerisation of styrene and butadiene in the presence of small amounts of tetrahydrofuran as randomizer gives a high proportion of homopolybutadiene blocks and a tapered transition to the polystyrene block. If the amount of tetrahydrofuran is increased, this gives butadiene-styrene copolymer blocks with some degree of random character, but at the same time there is also a sharp increase in the relative proportion of 1,2 linkages in the polydiene (1,2-vinyl content). The high 1,2-vinyl content, however, impairs the thermal stability of the corresponding block copolymers and increases the glass transition temperature.

DE-A 19615533 describes an elastomeric styrene-butadiene block copolymer in which the relative proportion of 1,2 linkages in the polydiene is 15% and the proportion of the hard phase is from 1 to 40% by volume. The polymerization of the soft phase is undertaken in the presence of a soluble potassium salt.

The use of potassium alcoholates or potassium hydroxide and of organolithium polymerization initiators is described in U.S. Pat. No. 3,767,632, U.S. Pat. No. 3,872,177, U.S. Pat. No. 3,944,528 and by C. W. Wolfford et al. in J. Polym. Sci, Part. A-1, Vol. 7 (1969), pp. 461–469.

Random copolymerisation of styrene and butadiene in cyclohexane in the presence of soluble potassium salts is described by S. D. Smith, A. Ashraf in Polymer Preprints 34 (2), 672 (1993) and 35 (2), 466 (1994). The soluble potassium salts mentioned comprise potassium 2,3-dimethyl-3-pentanolate and potassium 3-ethyl-3-pentanolate.

It is an object of the present invention to provide a glass-clear impact-modified polystyrene which has a balanced toughness/stiffness ratio and does not have the abovementioned disadvantages. In particular, the impact-modified polystyrene should have high intrinsic thermal stability and reduced thixotropy. It should also be compatible with styrene polymers, so that transparent mixtures are obtained. Efficiency in impact-modification of styrene polymers, in particular standard polystyrene, should be increased.

We have found this object is achieved by means of block copolymers comprising at least two hard blocks $S_1$ and $S_2$ made from vinylaromatic monomers and, between these, at least one random soft block B/S made from vinylaromatic monomers and from dienes, where the proportion of the hard blocks is above 40% by weight, based on the total block copolymer. In preferred block copolymers, the 1,2-vinyl content in the soft block B/S is less than 20%.

For the purposes of the present invention, vinyl content is the relative proportion of 1,2 linkages of the diene units, based on the total of 1,2, 1,4-cis and 1,4-trans linkages. The 1,2-vinyl content of the soft blocks is preferably from 10 to 20%, in particular from 12 to 16%.

vinylaromatic monomers which may be used for the hard blocks $S_1$ and $S_2$ or else for the soft blocks B/S are styrene, α-methylstyrene, p-methylstyrene, ethylstyrene, tert-butylstyrene, vinyltoluene or mixtures of these, preferably styrene.

Preferred dienes for the soft block B/S are butadiene, isoprene, 2,3-dimethylbutadiene, 1,3-pentadiene, 1,3-hexadienes or piperylene or mixtures of these, particularly preferably 1,3-butadiene.

It is preferable for the block copolymer to be composed exclusively of hard blocks $S_1$ and $S_2$ and also of at least one random soft block B/S, and not to contain any homopolydiene blocks B. Preferred block copolymers contain external hard blocks $S_1$ and $S_2$ having different block lengths. The molar mass of $S_1$ is preferably from 5000 to 30000 g/mol, in particular from 10,000 to 20,000 g/mol. The molar mass of $S_2$ is preferably above 35,000 g/mol. Preferred molar masses of $S_2$ are from 50,000 to 150,000 g/mol.

Between the hard blocks $S_1$ and $S_2$ there may also be more than one random soft block B/S. Preference is given to at least 2 random soft blocks $(B/S)_1$ and $(B/S)_2$ having different proportions of vinylaromatic monomers and therefore different glass transition temperatures.

The block copolymers may have a linear or star-shaped structure.

The linear block copolymer used preferably has the structure $S_1$—$(B/S)_1$—$(B/S)_2$—$S_2$. The molar ratio of vinylaromatic monomer to diene S/B in the block $(B/S)_1$ is preferably below 0.25 and in the block $(B/S)_2$ is preferably from 0.5 to 2.

The star-shaped block copolymers used are preferably those which have a structure in which at least one arm of the star has a block sequence $S_1$—(B/S) and one arm of the star has the block sequence $S_2$—(B/S), or those in which at least one arm of the star has the block sequence $S_1$—(B/S)—$S_3$ and at least one arm of the star has the block sequence $S_2$—(B/S)—$S_3$. $S_3$ here is another hard block made from the vinylaromatic monomers mentioned.

Particular preference is given to star-shaped block copolymers having structures in which the star has at least one branch having the block sequence $S_1$—$(B/S)_1$—$(B/S)_2$ and at least one branch having the block sequence $S_2$—$(B/S)_1$—$(B/S)_2$, or in which the star has at least one branch with the block sequence $S_1$—$(B/S)_1$—$(B/S)_2$—$S_3$ and at least one branch with the block sequence $S_2$—$(B/S)_1$—$(B/S)_2$—$S_3$. The molar ratio of vinylaromatic monomers to diene, S/B, is preferably in the range from 0.5 to 2 in the outer block $(B/S)_1$ and preferably below 0.5 in the inner block $(B/S)_2$. The higher content of vinylaromatic monomer in the outer random block $(B/S)_1$ makes the block copolymer more ductile for unchanged total butadiene content, and this proves to be particularly advantageous in blends with standard polystyrene.

The star-shaped block copolymers with the additional inner block $S_3$ have higher stiffness at comparable ductility. The block $S_3$ therefore acts as a filler within the soft phase, without changing the ratio of hard phase to soft phase. The molar mass of the blocks $S_3$ is generally substantially lower than that of the blocks $S_1$ and $S_2$. The molar mass of $S_3$ is preferably in the range from 500 to 5 000 g/mol.

The novel block copolymers may, for example, be formed by sequential anionic polymerisation, where at least the polymerisation of the blocks (B/S) takes place in the presence of a randomizer. The presence of randomizers brings about the random distribution of the dienes and vinylaromatic units in the soft block (B/S). Suitable randomizers are donor solvents, such as ethers, e.g. tetrahydrofuran, or tert-amines, or soluble potassium salts. In the case of tetrahydrofuran, the amounts used for ideal random distribution are generally above 0.25 percent by volume, based on the solvent. At low concentrations, "tapered" blocks are obtained with a gradient in comonomer makeup.

At the same time, the larger amounts specified of tetrahydrofuran are used, the proportion of 1,2 linkages of the diene units increases to from about 30 to 35%.

In contrast, if potassium salts are used there is only an insignificant increase in the 1,2-vinyl content in the soft blocks. The resultant block copolymers are therefore less susceptible to crosslinking and have lower glass transition temperature for the same butadiene content.

The potassium salt is generally used in molar deficiency, based on the anionic polymerisation initiator. The molar ratio selected of anionic polymerisation initiator to potassium salt is preferably from 10:1 to 100:1, particular preferably from 30:1 to 70:1. The potassium salt used should generally be soluble in the reaction medium. Examples of suitable potassium salts are potassium alcoholates, in particular a potassium alcoholate of a tertiary alcohol having at least 5 carbon atoms. Particular preference is given to use of potassium 2,2-dimethyl-1-propanolate, potassium 2-methylbutanolate (potassium tert. amylate), potassium 2,3-dimethyl-3-pentanolate, potassium 2-methylhexanolate, potassium 3,7-dimethyl-3-octanolate (potassium tetrahydrolinaloolate) or potassium 3-ethyl-3-pentanolate. The potassium alcoholates are obtainable, for example, by reacting elemental potassium, potassium/sodium alloy or potassium alkylates with the appropriate alcohols in an inert solvent.

It is useful for the potassium salt not to be added to the reaction mixture until the anionic polymerisation initiator has been added. In this way hydrolysis of the potassium salt by traces of protic contaminants can be avoided. The potassium salt is particularly preferably added just prior to polymerisation of the random soft block B/S.

Anionic polymerisation initiators which may be used are the usual mono-, bi- or multifunctional alkali metal alkyl compounds, alkali metal aryl compounds or alkali metal aralkyl compounds. It is advantageous to use organolithium compounds, such as ethyl-, propyl-, isopropyl-, n-butyl-, sec-butyl-, tert-butyl-, phenyl-, diphenylhexyl-, hexamethyldi-, butadienyl-, isoprenyl- or polystyryllithium, 1,4-dilithiobutane, 1,4-dilithio-2-butene or 1,4-dilithiobenzene. The amount of polymerisation initiator needed depends on the desired molar weight. It is generally from 0.001 to 5 mol %, based on the total amount of monomers.

A polymerization initiator is added at least twice during the preparation of the asymmetrical, star-shaped block copolymers. It is preferable for the vinylaromatic monomer $S_a$ and the initiator $I_1$ to be added simultaneously to the reactor and for the polymerization to be carried out to completion and then for vinylaromatic monomer $S_b$ and initiator $I_2$ to be added, again simultaneously. This method gives two "living" polymer chains $S_a$—$S_b$—$I^1$ and $S_b$—$I_2$ alongside one another, onto which the block $(B/S)_1$ is added by way of joint addition of vinylaromatic monomer and dienes and, where appropriate, the block $(B/S)_2$ is added by way of further joint addition of vinylaromatic monomer and dienes, and also, where appropriate, the block $S_3$ is polymerized by way of further addition of vinylaromatic monomer $S_c$. The ratio of initiator $I_1$ to initiator $I_2$ determines the relative proportion of the respective branches of the star randomly distributed within each star-shaped block copolymer after the coupling process. The block $S_1$ here is formed from the feeds of the vinylaromatic monomers $S_a$ and $S_b$, and the blocks $S_2$ and $S_3$ solely by way of the feed $S_b$ and, respectively, $S_c$. The molar initiator ratio $I_2/I_1$ is preferably in the range from 4/1 to 1/1, particularly preferably in the range from 3.5/1 to 1.5/1.

The polymerisation may be undertaken in the presence of a solvent. Suitable solvents are those aliphatic, cycloaliphatic or aromatic hydrocarbons which have from 4 to 12 carbon atoms and are usual for anionic polymerisation, such as pentane, hexane, heptane, cyclohexane, methylcyclohexane, iso-octane, benzene, alkylbenzenes, such as toluene, xylene or ethylbenzene, or decalin or appropriate mixtures. Preference is given to cyclohexane and methylcyclohexane.

The polymerisation may also be carried out without solvent in the presence of organyl metal compounds which slow down the rate of polymerisation, such as alkylmagnesium compounds, alkylaluminum compounds or alkyl zinc compounds.

Once the polymerisation has ended the living polymer chains may be capped using a chain terminator. Suitable chain terminators are protonating substances or Lewis acids, such as water, alcohols, aliphatic or aromatic carboxylic acids, or also inorganic acids, such as carbonic acid or boric acid.

Instead of adding a chain terminator once the polymerisation has ended, the living polymer chains may also be linked to give a star shape by polyfunctional capping agents, such as polyfunctional aldehydes, ketones, esters, anhydrides or epoxides. Symmetrical or asymmetrical star block copolymers whose arms may have the abovementioned block structures may be obtained here by coupling identical or different blocks. Asymmetrical star block copolymers are obtainable, for example, by preparing the individual arms of the star separately and/or by initiating more than once, for example initiating twice with the initiator divided in a ratio of from 2/1 to 10/1.

The novel block copolymers behave as glass-clear impact-modified polystyrene with a balanced toughness/stiffness ratio. Due to the random soft block B/S, the block copolymers of the invention are more thermally stable and ductile than corresponding block copolymers with a "tapered" B/S block for unchanged diene content. The block copolymers prepared in the presence of a potassium salt and having low 1,2-vinyl content have particularly high intrinsic thermal stability.

The novel block copolymers also have good compatibility with other styrene polymers, and may therefore be processed to give transparent polymer mixtures. The novel block copolymers or polymer mixtures may be used for producing fibers, forms of moldings.

EXAMPLES

Test Methods

The melt volume rate MVR (200° C./5 kg) was determined to ISO 1133.

Specimens for mechanical testing were injection-molded at 220° C. melt temperature and 45° C. mold temperature.

The modulus of elasticity, yield stress, breaking stress, elongation at yield point and elongation at break were determined from a tensile test ISO 527 with tensile specimens to ISO 3167.

The Vicat softening points VST/A and VST/B were determined to the DIN ISO 306 test specification.

The molecular weights were determined using gel permeation chromatography (GPC) on polystyrene gel columns of Polymer Labs. mixed B type with monodisperse polystyrene standards at room temperature using tetrahydrofuran as eluent.

The 1,2-vinyl content was determined by FT-IR-spectroscopy.

Examples 1 to 5

Linear styrene-butadiene block copolymers of structure $S_1$—$(B/S)_1$—$(B/S)_2$—$S_2$ were obtained by sequential anionic polymerisation of styrene and butadiene in cyclohexane as solvent at from 60 to 90° C. For this, 598 l of cyclohexane and 1,235 l of a 1.5 molar sec-butyllithium solution (n-hexane/cyclohexane) were the initial charge in a 1500 l stirred reactor and the amount of styrene required to prepare the block $S_1$ was metered in. After all of the styrene had been consumed, potassium tetrahydrolinalooate was added as randomizer and blocks $(B/S)_1$ and $(B/S)_2$ were attached by adding the mixtures made from styrene and butadiene and as seen in Table 1. Finally, the styrene block $S_2$ was polymerised and terminated using isopropanol. The block copolymers had a molar mass $M_n$ of 120,000 g/mol. The molar ratios of initiator/randomizer (Li/K) and the proportions of styrene and butadiene in the respective blocks based on the entire polymer are given in Table 1. For Examples 1 to 4 a total of 156 kg of styrene and 44 kg of butadiene were used and for Example 5 152 kg of styrene and 48 kg of butadiene were used.

Examples 6 to 8

Star-shaped styrene butadiene block copolymers of structures I and II were obtained by sequential anionic polymerisation of styrene and butadiene in cyclohexane as solvent at from 60 to 90° C. followed by coupling using epoxidized linseed oil (Edenol B 316 from Henkel).

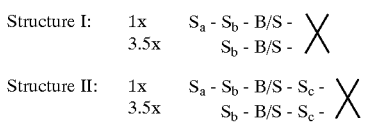

The block termed $S_1$ in the Description corresponds to $S_b$, $S_2$ is formed from $S_a$—$S_b$ and $S_3$ corresponds to $S_c$.

X is the radical of the coupling agent.

The process was carried out using an initial charge of sec-butyllithium and cyclohexane titrated to the end point with sec-butyllithium in a 10 l stirred reactor and metering in the amount of styrene (styrene I) needed to prepare the block $S_a$. This was followed by another initiation using sec-butyllithium (sec-BuLi II) and metering in the appropriate amount of styrene (styrene II) for the block $S_b$. After all of the styrene had been consumed, potassium tetrahydrolinoloolate (Li:K=20:1) was added as randomizer and the blocks (B/S) were attached by adding a mixture of styrene (styrene III) and butadiene. In the case of structure II another styrene block $S_c$ (styrene IV) was polymerised on. The resultant block copolymers were then coupled using Edenol B 316. The amounts of the starting materials used are given in Table 3 and the make-ups of the blocks and physical and mechanical properties of the block copolymers are given in Table 4.

TABLE 1

Block structure (proportions in % by weight) and randomizer proportion (molar ratio of Li/K) for the linear styrene-butadiene block copolymers

| Block Ex. | $S_1$ Styrene | $(B/S)_1$ Butadiene | $(B/S)_1$ Styrene | $(B/S)_2$ Butadiene | $(B/S)_2$ Styrene | $S_2$ Styrene | Li/K | 1,2-vinyl [%] |
|---|---|---|---|---|---|---|---|---|
| 1 | 18.0 | 14.7 | 8.3 | 7.3 | 15.7 | 36 | 60/1 | 16.2 |
| 2 | 18.0 | 14.7 | 8.3 | 7.3 | 15.7 | 36 | 80/1 | 14.5 |
| 3 | 18.0 | 14.7 | 8.3 | 7.3 | 15.7 | 36 | 40/1 | 17.9 |
| 4 | 9.0 | 14.7 | 8.3 | 7.3 | 15.7 | 45 | 60/1 | 15.2 |
| 5 | 9.0 | 14.7 | 8.3 | 9.3 | 13.7 | 45 | 60/1 | 15.8 |

TABLE 2

Mechanical data (test specimens stamped out from pressed sheet) for the linear styrene-butadiene block copolymers from Examples 1 to 5

| Example | Modulus of elasticity [MPa] | Yield stress [MPa] | Breaking stress [MPa] | Elongation at break [%] | Shore-hardness D [5] | Vicat-B softening point [5C] |
|---|---|---|---|---|---|---|
| 1 | 500 | 12.9 | 33.3 | 350 | 61 | 43.3 |
| 2 | 733 | 16.7 | 27.7 | 298 | 64 | 44.6 |
| 3 | 380 | 12.0 | 26.2 | 365 | 66 | 43.6 |
| 4 | 753 | 18.2 | 30.7 | 341 | 63 | 42.8 |
| 5 | 424 | 13.8 | 33.6 | 373 | 60 | 39.9 |

TABLE 3

Amounts of starting materials added for Examples 6 to 8

| | Block | Example 6 | Example 7 | Example 8 |
|---|---|---|---|---|
| Cyclohexane | | 3733 g | 3733 g | 3733 g |
| sec-BuLi I (1.55 m) | | 5.1 ml | 5.1 ml | 4.66 ml |
| Styrene I | $S_a$ | 635.2 g | 635.2 g | 616.3 g |
| sec-BuLi II (1.55 m) | $S_b$ | 17.93 ml | 17.93 ml | 16.37 ml |
| Styrene II | $S_b$ | 420.8 g | 420.8 g | 371.4 g |
| K THL (0.358 m in cyclohexane) | | 5.42 ml | 5.42 ml | 4.97 ml |
| Butadiene | B/S | 362.7 g | 272 g | 273.9 g |
| Styrene III | B/S | 181.3 g | 272 g | 137 g |
| Styrene IV | $S_c$ | | 205.3 g | |
| Edenol | | 5.58 ml | 5.58 ml | 5.10 ml |

TABLE 4

Physical and mechanical properties of star-shaped styrene-butadiene block copolymers

| Example | 6 | 7 | 8 |
|---|---|---|---|
| Structure | I | I | II |
| M ($S_a$) | 80000 | 80000 | 87600 |
| M ($S_b$) | 11852 | 11777 | 11740 |
| M (B/S) | 12698 | 15225 | 13000 |
| M ($S_c$) | — | — | 6490 |
| Weight ratio of styrene to butadiene in the block (B/S) | 1:2 | 1:1 | 1:2 |
| Proportion of butadiene in % by weight based on entire polymer | 20 | 17 | 17.1 |
| Proportion of soft block (B/S) in % by weight based on entire polymer | 30 | 34 | 25.65 |
| 1,2-vinyl content (%) FTIR | 15.9 | 19.5 | 7.2 |
| Tg (° C., DSC) | −54 | −22 | −66 |
| MVR (200° C./5 kg) | 9.7 | 11.2 | 5.3 |
| Vicat A softening (° C.) | 83.0 | 79.6 | 83.5 |
| Shore hardness A/D (° C.) | | | 96.9/71.6 |
| Modulus of elasticity (MPa) | 399 | 729 | 1294 |
| Yield stress (MPa) | 15.8 | 22.3 | 25.6 |
| Breaking stress (MPa) | 27.2 | 33.1 | 23.2 |
| Elongation at break (%) | 304 | 300 | 297 |

Example 9

In a manner similar to that of Examples 1 to 5, a linear styrene-butadiene block copolymer of structure $S_1$—(B/S)$_1$—(B/S)$_2$—$S_2$ was prepared by sequential anionic polymerization of styrene and butadiene. Potassium tert-amylate (PTA) was used as randomizer instead of potassium tetrahydrolinalooate. The molar ratio lithium/potassium was 38:1.

A mixture made from 4786 ml of cyclohexane and 1 ml of 1,1-diphenylethylene was titrated to the end point with 1.4 molar sec-butyllithium at 50° C. until a red coloration began to appear, and was then used as initial charge. The following starting materials were then added in four steps. After each addition, polymerization took place at 65° C. to complete conversion. Finally, the reaction was terminated with 1.70 ml of isopropanol, the mixture was acidified with 7.3 ml of formic acid, and this was followed by addition of 64 g of Irganox with 3052 and 102 g of trisnonylphenyl phosphite (TNPP) for stabilization.

The resultant block copolymer was devolatilized in a ZSK 25 twin-screw extruder.

Addition 1
  211 ml (192 g) of styrene
  10.4 ml of sec-butyllithium (1.4 molar in cyclohexane/n-hexane, 90/10)
  Potassium tert-amylate (PTA) 1.07 ml (0.338 molar in cyclohexane)

Addition 2
  Simultaneous addition of 335 ml of butadiene (219 g) and 146 ml of styrene (133 g)

Addition 3
  Simultaneous addition of 276 ml of butadiene (181 g) and 276 ml of styrene (251 g)

Addition 4
  Addition of 686 ml (624 g) of styrene

Example 10

Example 9 was repeated, except that 0.968 ml of PTA was used as randomizer. (Li:K=42:1)

Example 11

Example 9 was repeated, except that 3.62 ml of a 0.1 molar solution of potassium tetrahydrolinalooate in cyclohexane were used as randomizer.

TABLE 5

Analytical and mechanical data for injection-molded test specimens for Examples 9 to 11:

| | Example 9 | Example 10 | Example 11 |
|---|---|---|---|
| $^1$H NMR: Proportion of 1,2 addition for butadiene: | 15.1 | 13.7 | 12.7 |
| DSC: Glass transition temperatures [° C.] | −55/+90 | −55/+90 | −55/+90 |
| Tensile test: Modulus of elasticity [MPa] | 1175 | 1374 | 1170 |
| Tensile test: Yield stress [MPa] | 18.4 | 21.9 | 18.2 |
| Tensile test: Elongation at break [%] | 284 | 288 | 290 |
| Vicat ST B [° C.] | 36.7 | 40.7 | 36.5 |

Examples 12 to 19

| Structure Ib | 1x | $S_a$ - $S_b$ - (B/S)$_1$ - (B/S)$_2$ | ╲ |
| | 3.5x | $S_b$ - (B/S)$_1$ - (B/S)$_2$ | ╱ |
| Structure IIb | 1x | $S_a$ - $S_b$ - (B/S)$_1$ - (B/S)$_2$ - $S_c$ | ╲ |
| | 3.5x | $S_b$ - (B/S)$_1$ - (B/S)$_2$ - $S_c$ | ╱ |
| Structure III | 1x | $S_a$ - $S_b$ - (B/S)$_1$ - (B/S)$_2$ - (B/S)$_3$ - $S_c$ | ╲ |
| | 1.6x | $S_b$ - (B/S)$_1$ - (B/S)$_2$ - (B/S)$_3$ - $S_c$ | ╱ |

The block termed $S_1$ in the description corresponds to $S_b$, $S_2$ is formed from $S_a$ and $S_b$, and $S_3$ corresponds to $S_c$.

In a manner similar to that of Examples 8 to 11, star-shaped styrene-butadiene block copolymers of the structures I, Ib, IIb and III were prepared by sequential anionic polymerization of styrene and butadiene, using the amounts and feed sequence given in Table 5. The resultant block copolymers were then coupled using Edenol B 316 (tetrafunctional) and, respectively, diethyl carbonate (trifunctional). The physical and mechanical properties are given in Table 7.

Examples 20 to 27

Each of the block copolymers of Examples 12 to 20 was mixed with standard polystyrene (PS 158K from BASF) in a weight ratio of 30/70 (block copolymer/PS).

TABLE 7

Physical and mechanical properties of star-shaped styrene-butadiene block copolymers from Examples 12 to 19

| Example | Vicat B [° C.] | Shore hardness D [° C.] | Modulus of elasticity [MPa] | Yield stress [MPa] | Elongation at break [%] |
|---|---|---|---|---|---|
| 12 | 36.2 | 57 | 255 | 12.5 | 368 |
| 13 | 31.6 | 53 | 208 | 9.2 | 360 |
| 14 | 31.8 | 55 | 343 | 10.7 | 360 |
| 15 | 35.6 | 57 | 231 | 9.4 | 437 |
| 16 | 37.8 | 60 | 395 | 12.3 | 445 |
| 17 | 32.9 | 55 | 180 | 9.8 | 399 |
| 18 | 32.1 | 53 | 114 | 7.0 | 494 |
| 19 | 33.2 | 53 | 117 | 7.0 | 496 |

TABLE 8

Physical and mechanical properties of blends made from block copolymers of Examples 12 to 19 with GPPS

| Example | Block copolymer from Example | Vicat B [° C.] | Shore hardness D [° C.] | Modulus of elasticity [MPa] | Yield stress [MPa] | Elongation at break [%] |
|---|---|---|---|---|---|---|
| 20 | 12 | 76.3 | 75 | 1183 | 33.7 | 9.9 |
| 21 | 13 | 71.4 | 80 | 1236 | 34.2 | 11 |
| 22 | 14 | 63.7 | 79 | 1421 | 31.9 | 2.6 |
| 23 | 15 | 80.4 | 77 | 1169 | 28.5 | 49 |
| 24 | 16 | 86.9 | 77 | 1830 | 37.3 | 17 |
| 25 | 17 | 79.9 | 77 | 855 | 31.7 | 35 |
| 26 | 18 | 76.1 | 75 | 1467 | 27.6 | 49 |
| 27 | 19 | 78.7 | 74 | 1044 | 27.9 | 63 |

We claim:

1. A star-shaped block copolymer comprising at least two external hard blocks $S_1$ and $S_2$ made from vinylaromatic monomers and having different block lengths, at least one random soft block B/S made from vinylaromatic monomers and from dienes and a 1,2-vinyl content in the soft block B/S of less than 20%, an additional inner hard block $S_3$ made from vinylaromatic monomers, wherein the proportion of the hard blocks is above 40% by weight, based on the total block copolymer.

2. A block copolymer as claimed in claim 1, in which there is no homopolymer block B made from dienes.

3. A block copolymer as claimed in claim 1, wherein the molecular weight of $S_1$ is from 5,000 to 30,000 g/mol and the molecular weight of $S_2$ is above 35,000 g/mol.

4. A block copolymer as claimed in claim 1, wherein there are at least two random soft blocks $(B/S)_1$ and $(B/S)_2$ having different relative proportions of vinylaromatic monomers between the hard blocks $S_1$ and $S_2$.

5. A block copolymer as claimed in claim 1 which has a star-shaped structure where at least one arm of the star has the block sequence $S_1$—(B/S)—$S_3$ and at least one arm of the star has the block sequence $S_2$—(B/S)—$S_3$.

6. A block copolymer as claimed in claim 1, which has a star-shaped structure where at least one arm of the star has the block sequence $S_1$—$(B/S)_1$—$(B/S)_2$—$S_3$ and at least one arm of the star has the block sequence $S_2$—$(B/S)_1$—$(B/S)_2$—$S_3$, and the molar ratio of vinylaromatic monomer to diene S/B in the block $(B/S)_1$ is from 0.5 to 2, and in the block $(B/S)_2$ is less than 0.5.

7. A block copolymer as claimed in claim 5, wherein the molecular weight of $S_3$ is from 500 to 5000 g/mol.

8. A polymer mixture made from block copolymers as claimed in claim 1 and from other styrene polymers.

9. A process for preparing block copolymers as claimed in claim 1, which comprises forming the block copolymers by sequential anionic polymerization, where at least the polymerization of the soft block (B/S) takes place in the presence of a potassium salt.

10. A process for preparing block copolymers as claimed in claim 9, wherein the molar ratio selected of anionic polymerization initiator to potassium salt is from 10:1 to 100:1.

11. A process for preparing block copolymers as claimed in claim 9, wherein the potassium salt used comprises a potassium alcoholate of a tertiary alcohol having at least 7 carbon atoms.

12. A process for preparing block copolymers as claimed in claim 9, wherein the potassium salt used comprises a potassium 2-methylbutanolate, potassium 2,2-dimethyl-1-propanolate, potassium 2,3-dimethyl-3-pentanolate, potassium 3,7-dimethyl-3-octanolate or potassium 3-ethyl-3-pentanolate.

13. A process for preparing block copolymers as claimed in claim 1, wherein on two occasions a polymerization initiator $I_1$ and $I_2$ is added together with vinylaromatic monomer, and the molar ratio $I_2/I_1$ is from 4/1 to 1/1.

* * * * *